United States Patent [19]

Huidekoper

[11] Patent Number: 4,867,467
[45] Date of Patent: * Sep. 19, 1989

[54] SUSPENSION OF A STEERABLE WHEEL

[76] Inventor: Louis Huidekoper, Paviljoensgracht 90, 2512 BR The Hague, Netherlands

[*] Notice: The portion of the term of this patent subsequent to Aug. 16, 2005 has been disclaimed.

[21] Appl. No.: 66,724

[22] Filed: Jun. 24, 1987

[30] Foreign Application Priority Data

Jun. 25, 1986 [NL] Netherlands ............... 8601667

[51] Int. Cl.[4] ............... B62K 21/02; B62K 25/22
[52] U.S. Cl. ............... 280/276; 280/279; 280/96.3
[58] Field of Search ............... 280/673, 963, 275, 276, 280/277, 279, 270, 690; 180/263

[56] References Cited

U.S. PATENT DOCUMENTS

| 1,750,518 | 3/1930 | Heldenbrand | 280/96.3 |
| 2,039,671 | 5/1936 | Wagner | 280/95 R |
| 3,476,200 | 11/1969 | Schoepe et al. | 280/96.3 |
| 4,082,307 | 4/1978 | Tait | 280/277 |
| 4,265,329 | 5/1981 | de Cortanze | 280/275 |
| 4,526,249 | 7/1985 | Parker | 280/275 |
| 4,763,920 | 8/1988 | Huidekoper | 280/696 |

FOREIGN PATENT DOCUMENTS

| 738701 | 6/1932 | France | 280/270 |
| 2539375 | 7/1984 | France | . |
| 7901467 | 8/1979 | Netherlands | . |
| 18559 | of 1913 | United Kingdom | 280/277 |
| 118158 | 8/1918 | United Kingdom | 280/96.3 |
| 750590 | 6/1956 | United Kingdom | 280/276 |

Primary Examiner—Charles A. Marmor
Assistant Examiner—Karin Tyson
Attorney, Agent, or Firm—Bachman & LaPointe

[57] ABSTRACT

Wheel suspension for a steerable wheel having a support plate to which two hinge joints are attached. These hinge joints are connected with their other ends to a support structure. To the support plate the inner ring or rings of the wheel bearing or wheel bearings are attached. The hinge joints are located at a distance from the axial center-line of the wheel bearing means that is smaller than the distance from the wheel inner bearing inner ring or rings to the axial center line.

8 Claims, 7 Drawing Sheets

SUSPENSION OF A STEERABLE WHEEL

The invention relates to a suspension of a steerable wheel for a vehicle comprising a support plate to which two pivot joints are secured, on the one hand being connected to a support structure and on the other hand the inner ring or rings of the wheel bearing or wheel bearings are mounted.

Such a suspension is generally known in the automobile technology as a front suspension. Because this construction is much stiffer for motorcycles than the well-known telescopic front fork, it has been tried many times to adapt such suspension systems for use on motorcycles. The usual motorcycle front fork has another disadvantage when braking on uneven surfaces, because both the accommodating of the braking forces and the inward and outward movements follow in the same direction. Furthermore, the telescopic front fork is an elaborate construction, while with the larger wheel-suspension-movements the steering geometry changes significantly, and the bending resistance of the construction is limited.

One of the embodiments now used for motorcycles comprises a hub-carrier with two spherical joints and is known as the "Elf-Honda". With this construction, known from the automobile technology, the wheel rim has a dish shape so that the steering axis or "king pin" can be placed in the center wheel plane. Asymmetrical suspension arms are connected to the hub-carrier at the open side of the wheel rim. The suspension arms extend around the wheel, having sufficient clearance for steering, to the back of the front wheel, where they are hinged to the frame or chassis. Steering can be accomplished by means of mechanical means. The wheel bearing means are secured to the hub-carrier. Although this construction has a number of advantages over the usual telescopic fork, it contains a number of disadvantages as well. For instance, the asymmetrical suspension arms are loaded in both torsion and bending, and have to be made strong enough and therefore heavy. Under high loading conditions the suspension arms will remain slightly flexible and allow the wheel-axle to rotate perpendicular to the suspension plane, thus allowing the front wheel to run out of track with the rear wheel and deteriorating the steerability or "handling" of the motorcycle. The hub-carrier itself is not symmetrical, having the wheel bearing means located at one side, causing the hub-carrier to be loaded in bending, such that it has to be constructed strongly and therefore heavily. The spring/damper suspension unit loads the suspension arm in bending by the way it is mounted because of lack of space.

The present invention aims to avoid these disadvantages and to provide a simpler, lighter, yet very stiff and strong suspension system for a steerable wheel.

This aim is realized with a suspension as described above by arranging the pivot joints at a distance from the axial center-line of the wheel bearing means that is smaller than the distance from the wheel bearing inner ring or inner rings to the axial center-line. By selecting the inner rings of the wheel bearing means such that the pivot joints can be placed inside it or its extension, the problems arising from the asymmetrical support plate are solved. At present wheelbearings having a relatively large bore, for instance 140 MM and a small section such as 8 MM, are available as tapered roller bearings, angular contact ball bearings, deep groove ball bearings or four-point contact ball bearings, etc. With this construction it is quite easy to attach a steering device.

According to one advantageous embodiment of this invention the suspension arm structure is provided at one side of the wheel. The construction of this suspension system is simple. To further stiffen the suspension system, it is possible to provide for suspension arms on both sides of the wheel. Because of the relatively large bore of the inner rings of the bearings, it is possible to provide a continuous construction through the center of the wheel, while it is still possible to have sufficient steering angle for the vehicle to be normally maneuverable. When the suspension arm is on both sides of the wheel, it can contain a "bridge-member", which would provide considerable stifness coupled to low weight.

According to another advantageous embodiment of this invention, the support structure comprises at least two suspension arms each connected through a pivot joint. These suspension arms can be connected through different pivot joints on the frame or the chassis. In this way some properties of the suspension geometry can be made constant throughout the range of the suspension travel as is known in the motor vehicle industry, or such changes can be provided that a desired functioning of the suspension geometry is obtained. It is clearly depending on the kind of use of the wheel suspension according to this invention that one or another suspension geometry will prove to be the optimum solution for the task. The use of this system on two-wheeled vehicles will probably call for different geometrical requirements than when used on vehicles with more than two wheels. When using two independent suspension arms, it is for instance possible for the steering arm to extend between these suspension arms. Again through geometrical variation in the design it is possible to influence the steering characteristics of the vehicle in many ways.

According to another advantageous embodiment, the suspension arm structure comprises two triangular suspension arms, each connected through a pivot joint. Thus, both the advantages of the system with two independent suspension arms, and the advantages resulting from the use of large bore bearings are combined. On the one hand this provides a mechanically very strong-/rigid suspension structure and on the other hand it provides the geometrical possibilities to obtain the optimum in road-holding, both at low speeds and at high speeds, as well as in terms of acceleration and deceleration, while any desired spring and damper characteristic can be employed. This suspension can be combined with any kind of spring and/or damper operating device known in the prior art, such as a rocker, push or pull rod operating a bellcrank, or placing a spring and-/or damper device directly between a suspension arm and the chassis.

For better understanding of the invention this will be described in more detail referring to the enclosed drawings. In the drawings.

Figure 1:
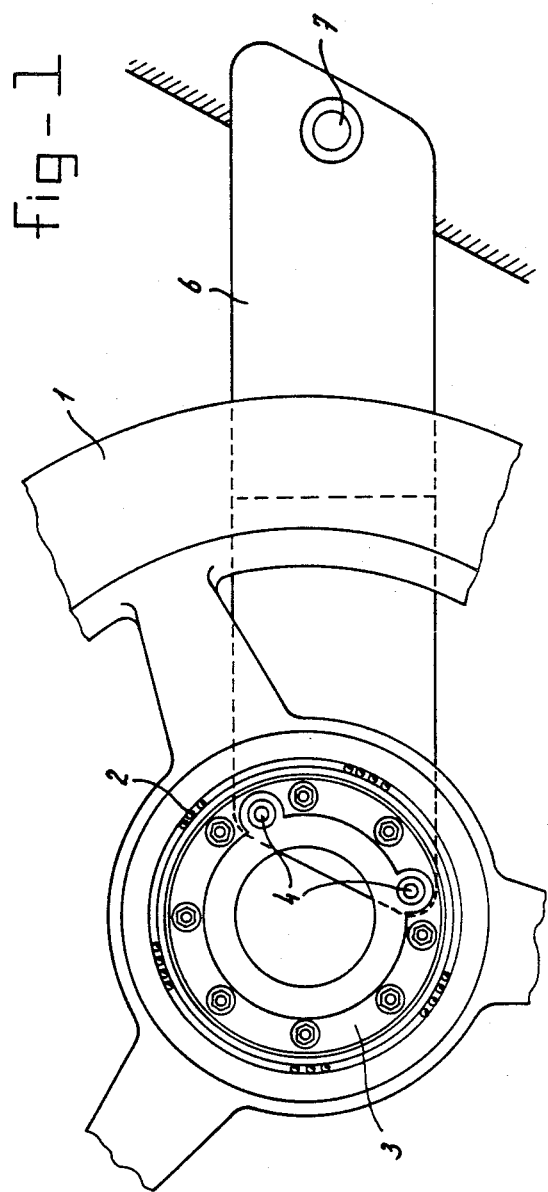
FIG. 1 shows a first embodiment of a wheel suspension construction with suspension arm on one side of the wheel.

In the figures, the suspension system is shown diagrammatically only. Damper and/or spring units are not shown for sake of clarity. For the same reasons a chassis or frame is pictured in phantom. In FIG. 1 a wheel of a vehicle is referred to as reference numeral 1. Although the invention is here described with regard to a two-wheeled vehicle, such as a motorcycle, it must be clearly understood that the suspension for a steerable wheel according to the invention can be used on any sort of vehicle with wheels. The wheel 1 is connected to the support plate 3 through one or more wheel bearing(s) 2. Two suspension pivot joints or spherical hinge joints 4" arranged in the support plate 3 are connected to a support arm 6, which in turn is connected to the chassis or frame of the vehicle by pivot 7. There is no steering arrangement pictured in FIG. 1. Support arm 6 is curved near the outer extremity of the wheel to accommodate the steering angle of the wheel 1. Bearings 2 can be any known sort of bearing in the art, as double row tapered roller bearings, angular contact bearings, deep groove ball bearings or four-point contact ball bearings, or any comparable bearing arrangement that can accommodate both axial and radial loads. Depending on the use the bearing unit(s) will have to be selected according to the expected load ratings. The only condition for selection of the inner ring of bearing 2, is that it must be dimensioned such as to be able to accommodate a support plate 3 large enough for accommodating the pivot joints 4 having such a distance that a sufficiently rigid structure is provided.

Figure 2:
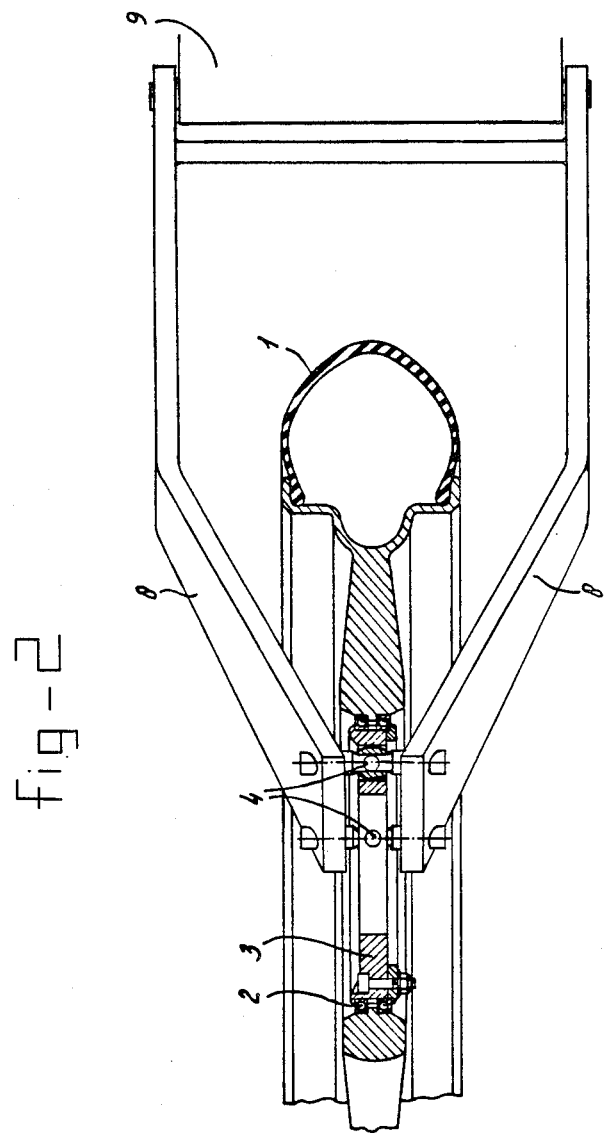
FIG. 2 shows a second embodiment of the present invention with suspension arms on both sides of the wheel, shown in plan view and partially in cross-section.

In FIG. 2 another embodiment of the invention is shown. The support system consists of two suspension arms 8, both connected to the two pivot joints 4. FIG. 2 clearly shows the pivot joints 4 arranged within the wheel bearing(s) 2. This can provide for a very rigid construction. Both suspension arms 8 can be hingedly connected to the frame/chassis 9, which is not being shown in any detail. The system allows the chassis or frame of for example a motorcycle to be significantly simplified, because the connection between front and rear wheels is much shorter. This improves the rigidity of the chassis/frame, yet allows it to be lighter than a conventional assembly.

Figure 3:
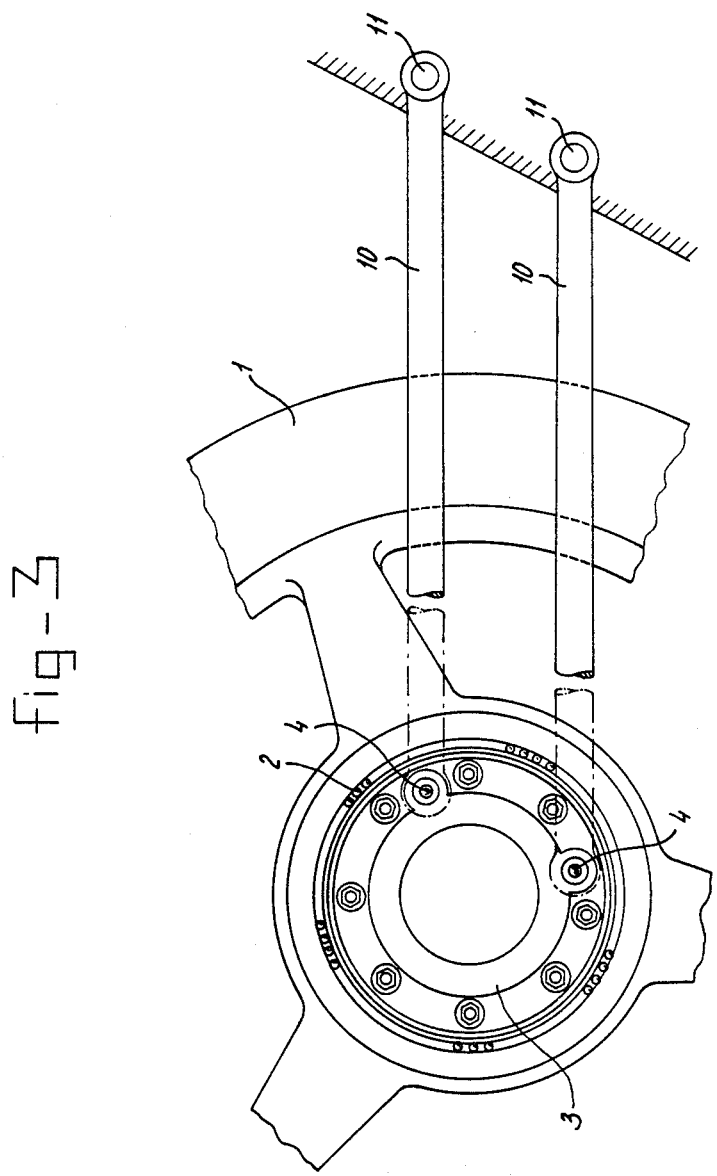
FIG. 3 shows a side-view as in FIG. 1, but with two suspension arms at one side of the wheel.

FIG. 3 shows two suspension arms 10 both on the same side of the wheel 1. This embodiment can be combined with the embodiment according to FIG. 2 such that two suspension arms 10 of triangular shape are formed. Each support arm 10 hinges on its own pivot 11 on the frame, enabling the design of different suspension geometries, to obtain a desired effect as described above. The geometry of the movement of the wheel and/or the steering geometry can be adapted as desired, by choosing the position of the pivot points in support plate 3. It is within the scope of the invention to design many structural and geometrical combinations. The problems of torsional stiffness can be solved simply by employing one or two triangular suspension arms. It is possible to make the center-lines of the support arms coincide substantially with the center-lines of the forces which helps provide for a very light yet rigid structure.

Figure 4:
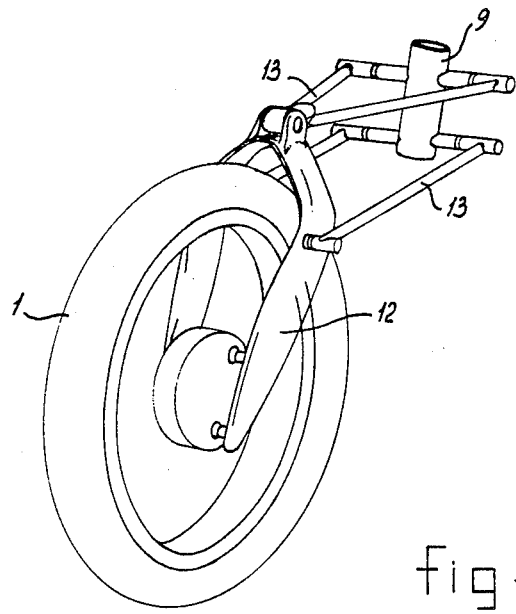
FIG. 4 shows a further embodiment according to the invention with a bridge-member.

FIG. 4 shows a further embodiment wherein the suspension system contains a bridge-member 12, which is connected through further suspension arms 13 to the frame 9.

Figure 5:
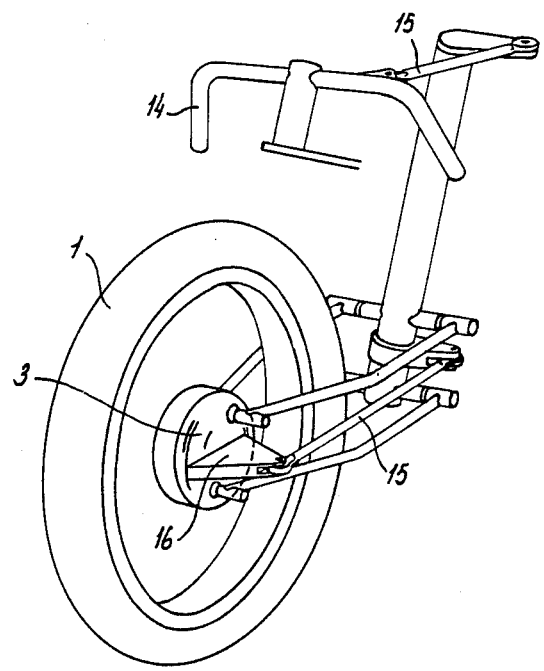
FIG. 5 shows an embodiment with a steering linkage system that can be used with one of the previous figures.

FIG. 5 shows diagrammatically a possibility of a steering system for such a suspension system. The support structure is not pictured for clarity. Through a linkage system 15 steering movement of the steering member is transferred to a steering arm 16, that is mounted on the support plate 3.

Figure 6:
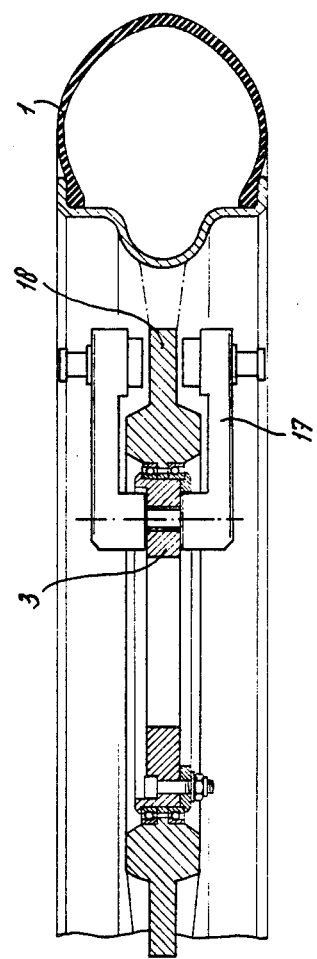
FIG. 6 shows a cross-section of a suspension as in previous figures with a brake disc added.

FIG. 6 shows diagrammatically a possibllity for a brake calliper 17 arrangement. For simplicity no other components of the suspension system are shown. This brake calliper can consist of two parts that are mounted on either side of the plate or that are mounted by means of holed brackets to the support plate 3. The brake calliper 17 can grip section 18 of the wheel rim that performs a double function both as load carrying wheel rim and as brake disc. Of course it is possible to mount a brake disc connected with the wheel rim such that the brake disc would no longer grip in the center of the wheel. In this case it might be possible to use two brake discs to compensate for the braking moment.

Figure 7:
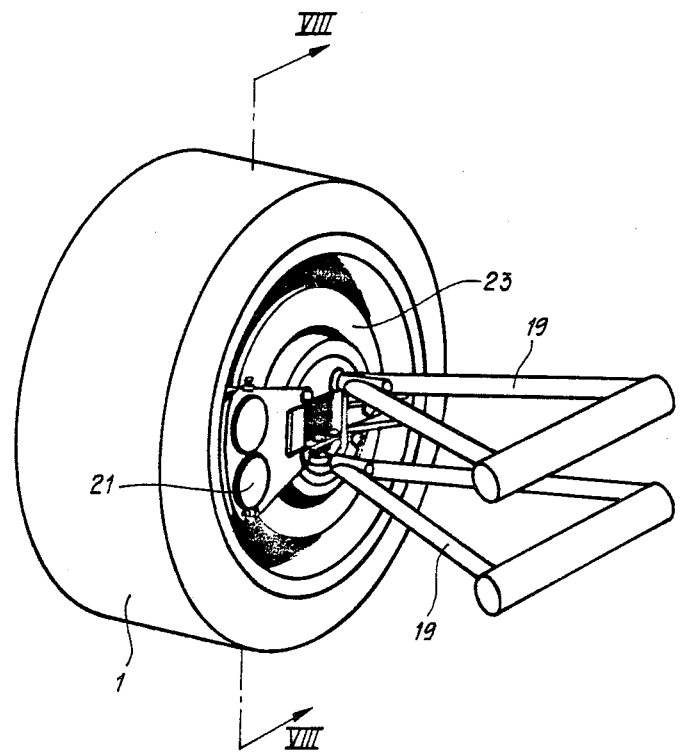

FIG. 7 shows a further embodiment of the invention. There are two usual trangularly shaped suspension arms 19, that can be connected to the frame/chassis of the vehicle by any known method in the art.

Figure 8:
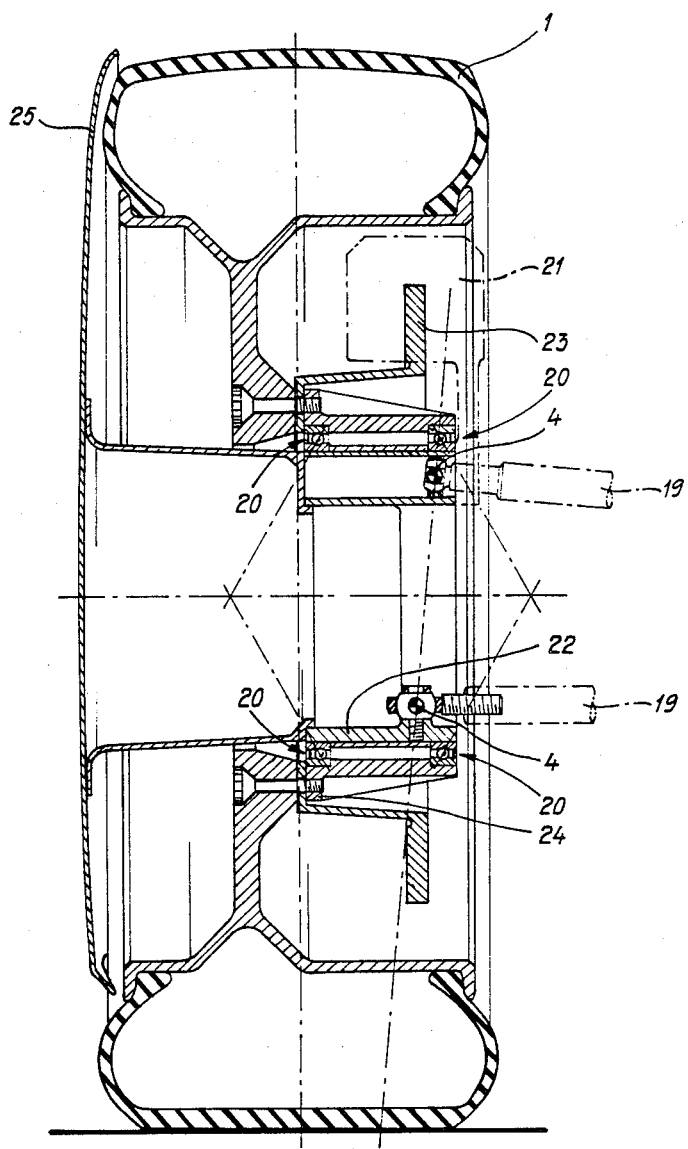

FIG. 8 shows in cross-section the embodiment shown in FIG. 7 and it is clear that the pivot joints 4 are inside the diameter of the wheel bearing means 20. This cross-sectional drawing also shows the presence of a brake calliper 21 that is fastened to carrier-plate 22. This Brake calliper 21 grips brake disc 23 that is mounted to wheel-flange 24 in the usual way. The previously described construction, where the brake disc is part of the wheel rim, could also be used. Because of the large internal diameter of the wheel bearing means 20 it is also possible to stably mount a cap 25. This cap does not rotate with the wheel, but mounted to the carrier-plate 22, will follow all other wheel movements. This means that it becomes possible to cover the wheel with an elaborate cap, which has significant advantages both from an aerodynamic point of view as from a safety point of view. This cap can be positioned very closely to the wheel. Because the cap/cover does not rotate with the wheel, contrary to conventional hub-caps, the cap does not have to be made rotation symmetrical.

Although the above described embodiments are presently preferred, it will be understood that anyone skilled in the art will be capable of introducing many variations without reaching beyond the scope of the present invention as described above and as described in the following claims.

The suspension arms respectively can be linked in ways as such known in the automobile technology, wherein the suspension arm(s) is/are substantially perpendicular to the plane of the wheel. However any other suspension arm positions are not excluded. The pivot joints, contrary to what is shown in the drawings, can be outside the wheel bearing means but at a distance from the axial center-line of the wheel bearing means that is smaller than the distance between the inner ring or inner rings of the wheel bearing means to that center-line.

I claim:

1. Suspension of a steerable wheel for a vehicle which comprises: a support plate; a support structure; two spherical hinge joints providing both steering and suspension movement attached on the one hand to said support plate and on the other hand to said support structure; one or more wheel bearing means each having an inner ring attached to said support plate, said wheel bearing means having a diameter wherein the spherical hinge joints are within the diameter of the wheel bearing means, said wheel bearing means having an axial center-line, wherein both spherical joints are located at a distance from the axial center-line that is smaller than the distance of the wheel bearing inner ring to the axial center-line.

2. Suspension according to claim 1 wherein the support structure is arranged at one side of the wheel.

3. Suspension according to claim 1 wherein the support structure is arranged at both sides of the wheel.

4. Suspension according to claim 1 wherein the support structure comprises at least two support arms, wherein said support arms are connected to said support plate by said spherical hinge joints.

5. Suspension according to claim 1 wherein the support structure comprises two triangular arms, wherein said arms are connected to said support plate by said spherical hinge joints.

6. Suspension according to claim 1 wherein a cap is mounted on the inner ring of the wheel bearing means which covers at least a part of the wheel.

7. Suspension according to claim 1 including a wheel hub and an outer ring of said wheel bearing means, wherein said outer ring is attached to the wheel hub.

8. Suspension of a steerable wheel for a vehicle including a frame, said suspension comprising: a support plate; suspension arms connected to the frame; a bridge member connected to said suspension arms and to said support plate; two spherical hinge joints providing both steering and suspension movement attached on one hand to said support plate and on the other hand to said bridge member; wheel bearing means having an inner ring attached to said support plate, said wheel bearing means having an axial center-line, wherein both spherical joints are located at a distance from the axial center-line that is smaller than the distance of the wheel bearing inner ring to the axial center-line.

* * * * *